(12) United States Patent
Gilbert et al.

(10) Patent No.: US 6,977,059 B2
(45) Date of Patent: Dec. 20, 2005

(54) MOLTEN METAL SHAFT COUPLING SYSTEM

(75) Inventors: Ronald Gilbert, Liberty Lake, WA (US); Mike Klepacki, Newtown, CT (US)

(73) Assignee: Pyrotek, Inc., Spokane, WA (US)

( * ) Notice: Subject to any disclaimer, the term of this patent is extended or adjusted under 35 U.S.C. 154(b) by 0 days.

(21) Appl. No.: 10/310,682

(22) Filed: Dec. 4, 2002

(65) Prior Publication Data

US 2004/0108635 A1    Jun. 10, 2004

(51) Int. Cl.[7] ............................................. C21C 7/00
(52) U.S. Cl. ........................ 266/239; 266/235; 285/40
(58) Field of Search ................................ 266/239, 236, 266/235; 285/40; 222/602

(56) References Cited

U.S. PATENT DOCUMENTS

| 4,895,349 | A | * | 1/1990 | Broom | 266/45 |
| 5,522,624 | A | * | 6/1996 | Edin | 285/40 |
| 5,912,916 | A | * | 6/1999 | Hendrix | 373/94 |
| 6,358,467 | B1 | | 3/2002 | Mordue | 266/239 |

* cited by examiner

Primary Examiner—Scott Kastler
(74) Attorney, Agent, or Firm—Wells St. John P.S.

(57) ABSTRACT

A molten metal pump shaft coupling system for use in the coupling or connection of elongated shafts to other components and equipment, and for the disconnection thereof. A coupling with internal discontinuous threads may be coupled with an externally threaded shaft, with either continuous or discontinuous threads. Aspects of the invention include multiple external threads which may be pitched to accomplish a quicker and more efficient disconnect system. Furthermore, a shaft removal system is provided which provides two points of contact to assist in rotating a broken shaft end out of a coupling.

9 Claims, 6 Drawing Sheets

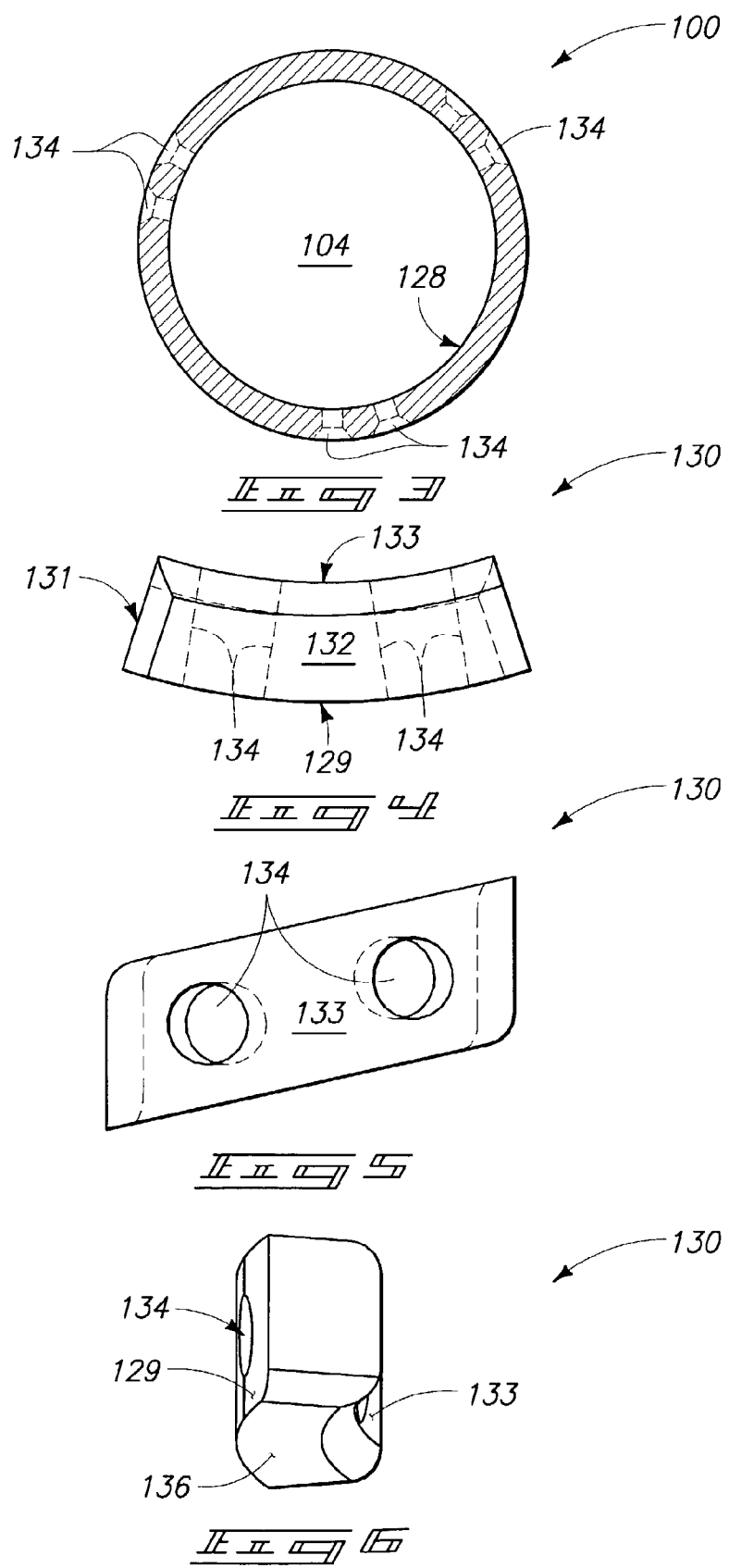

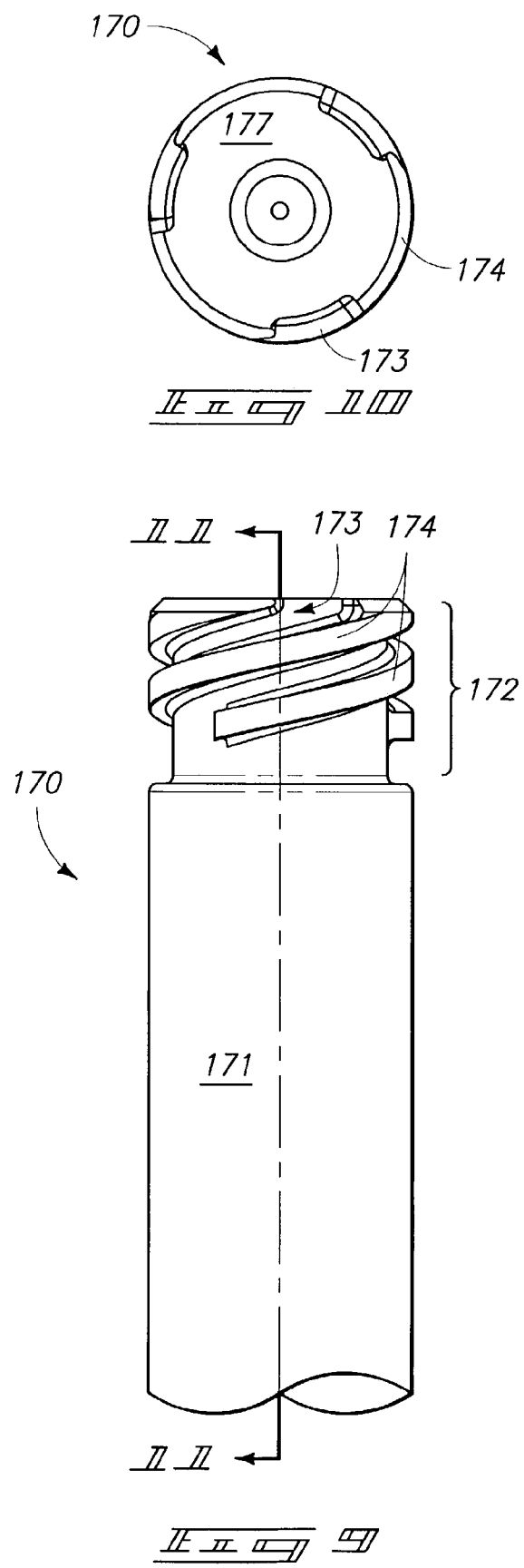

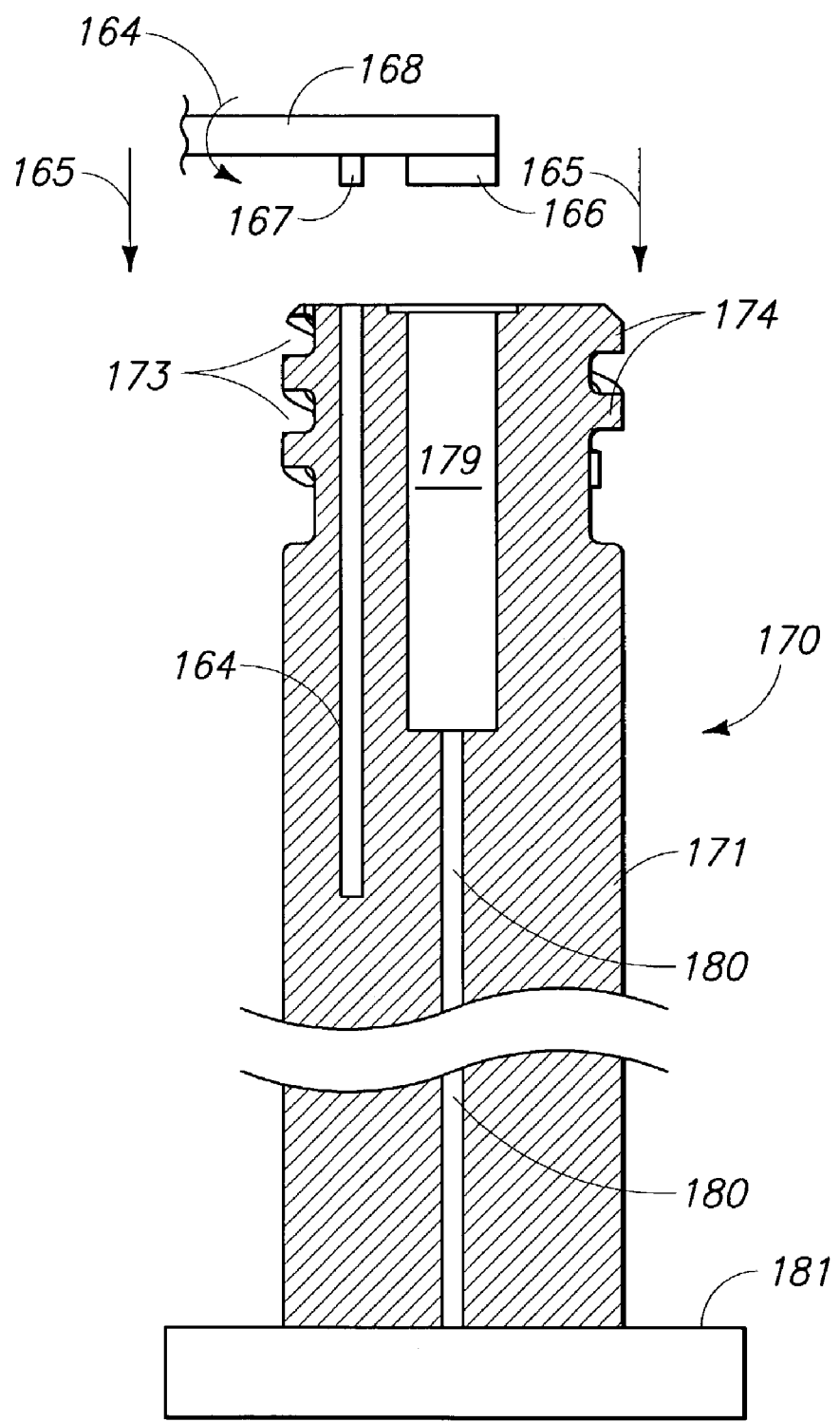

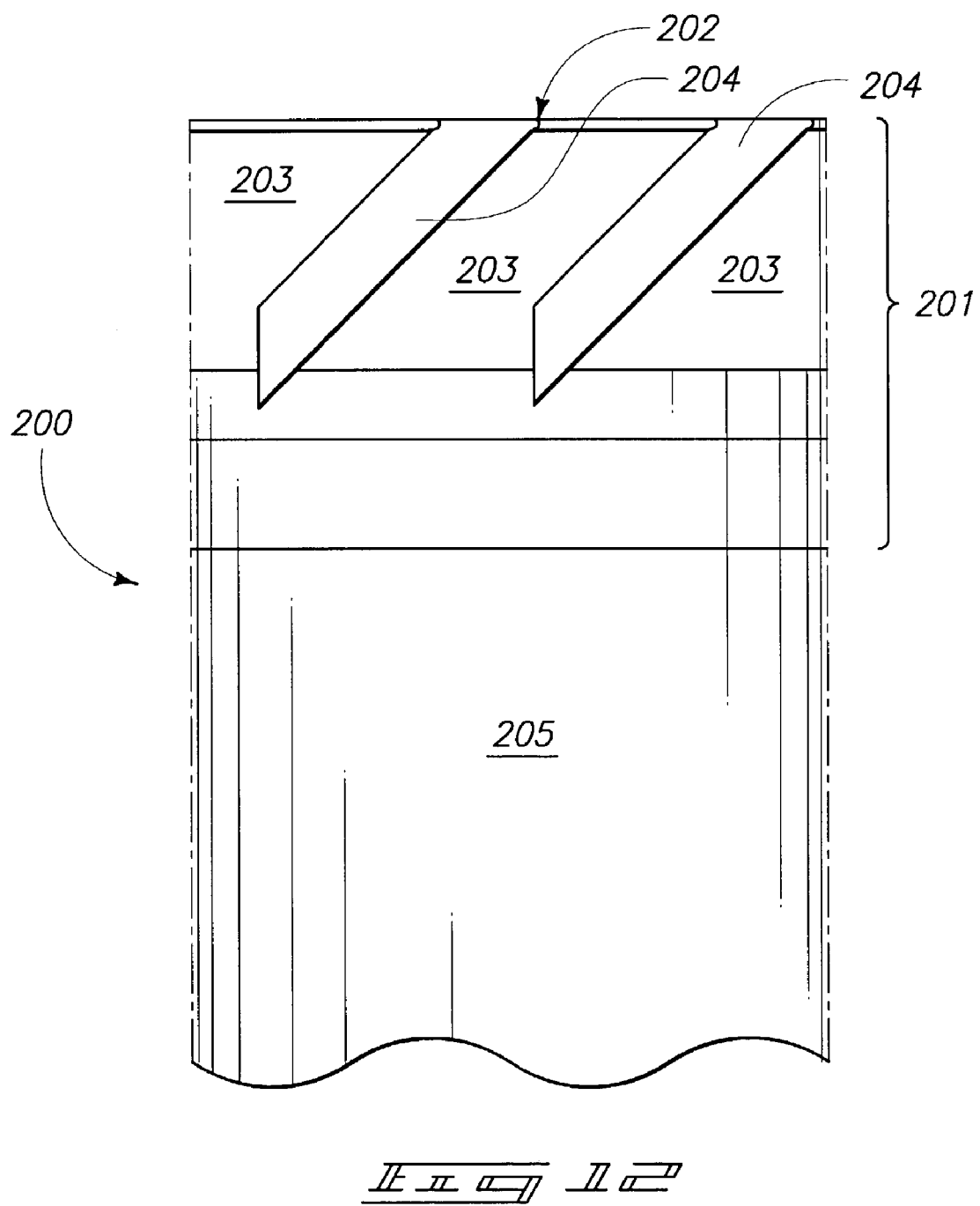

6,977,059 B2

MOLTEN METAL SHAFT COUPLING SYSTEM

CROSS REFERENCE TO RELATED APPLICATION

There are no related applications.

TECHNICAL FIELD

This invention pertains to a molten metal pump shaft coupling system for use in the coupling or operational attachment and detachment of elongated shafts to drive systems other components and equipment.

BACKGROUND OF THE INVENTION

This invention relates to molten metal processing systems and more particularly to a coupling system for use in molten metal processing systems. There are several different types of molten metal processing systems, such as pumps, degassing unites, and flux injection devices, all of which are well known in the art.

In many of these systems, a shaft is used to transmit rotation from a motor or other drive system or device to an impeller, rotor or other system component. In the molten metal pump application, this coupling device provides an operational attachment of the top part of the shaft to the drive system or motor. In prior art designs, a straight threaded design is utilized such that one external thread is machined into the external surface of the top portion of the graphite shaft and a corresponding internal thread is provided in a coupling mechanism, which is then attached or operationally attached to the motor drive system. The shaft is then rotated into the coupling by typically turning it at least one revolution, until it is securely fastened to the coupling. Long continuous corresponding threads are more cumbersome to rotate together and tend to have a relatively high failure rate.

In other prior art systems, a vertical channel, an elbow and an approximately horizontal channel are cut into the shaft, and corresponding protrusions or bumps within the inner or internal cavity of the coupling system slide up into the vertical channel and then over in the horizontal channel. However these systems are not believed as reliable as a system which includes a partial thread for greater engagement area between the shaft and the coupling, such as provided by this invention.

Molten metal may be one of the more difficult environments in which to maintain a pump or a coupling system, due to the heat and corrosive factors within the molten metal. The submerged components of these pumps and coupling systems are typically made of graphite, ceramics or similar materials due to the ability of these types of material compositions to withstand the heat and corrosive effects of the molten metal environment. If there is a failure of the shaft such as the shaft breaking, it is necessary to remove the stub within the coupling with a chisel and hammer, which causes additional potential problems with the coupling.

It is an object of aspects of this invention to provide an improved coupling system for use in coupling or attaching a molten metal shaft to another component.

It is also an object of embodiments of this invention to provide a way to remove the stub once an end of the shaft has broken off within the coupling.

BRIEF DESCRIPTION OF THE DRAWINGS

Preferred embodiments of the invention are described below with reference to the following accompanying drawings.

FIG. 3 is section 3—3 from FIG. 1;

FIG. 4 is a top view of one embodiment of a discontinuous thread which may be utilized within the coupling member illustrated in FIGS. 1 through 3;

FIG. 5 is an elevation view of the discontinuous thread illustrated in FIG. 4;

FIG. 6 is an end view of the discontinuous thread illustrated in FIG. 5;

FIG. 9 is an elevation view of one embodiment of a shaft member which may be utilized in combination with a coupling member as contemplated by this invention;

FIG. 10 is a top view of the shaft member illustrated in FIG. 9;

FIG. 11 is section view 11—11 from FIG. 9; and

FIG. 12 is an elevation view of another embodiment of a shaft member which may be utilized in a coupling system contemplated by this invention, only with a greater number of parallel threads than illustrated in prior Figures.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
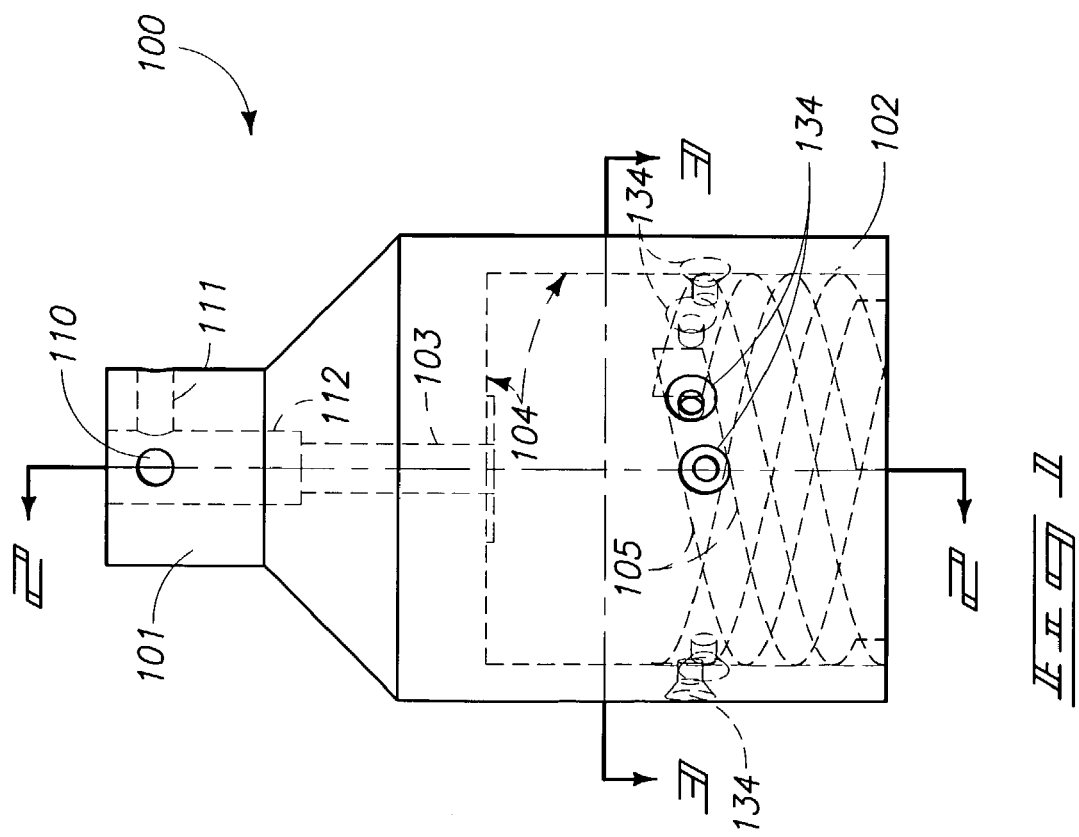
FIG. 1 is an elevation view of one embodiment of a coupling member which may be utilized in a coupling system contemplated by this invention.

FIG. 1 is a front elevation view of a coupling 100 which may be utilized in an embodiment of this invention, the coupling 100 including top portion 101, bottom portion 102, inner cavity 104, configured with internal threads 105 for receiving an externally threaded shaft rotationally. FIG. 1 further shows discontinuous thread bolts 106, 107 and 112 which are utilized to attach discontinuous threads (shown in FIG. 7) in the proper location to act as discontinuous threads to engage with external threads on a shaft member.

FIG. 1 further shows apertures 103 and 112, pin aperture 110 and transverse aperture 111, at or toward the top portion 101 of coupling 100. The top portion 101 of the coupling 100 is generally configured to engage, operatively attach to, or interconnect with a drive system for rotating the coupling and a shaft to which the coupling is attached.

The bottom portion 102 of the coupling 100, including inner cavity 104, is configured to operatively attach to an externally threaded shaft in a threaded manner, preferably by relative rotation. FIG. 1 also shows bolt apertures 134 in the coupling body, the bolt apertures being configure to receive bolts which secure discontinuous threads (shown in later Figures) on the inner wall with the inner cavity 104. FIG. 1 shows as hidden line possible thread passageway 105, which may be merely representative of a path that external threads on a shaft may follow, or the pathway may be machined into the inner wall of the inner cavity 104 of the coupling 100.

It will be noted by those of ordinary skill in the art that the terms top and bottom as used herein are for identification or orientation in the Figures, and the invention is not limited to such, but instead the components and systems disclosed herein may be used in any one of a number of configurations.

Figure 2:
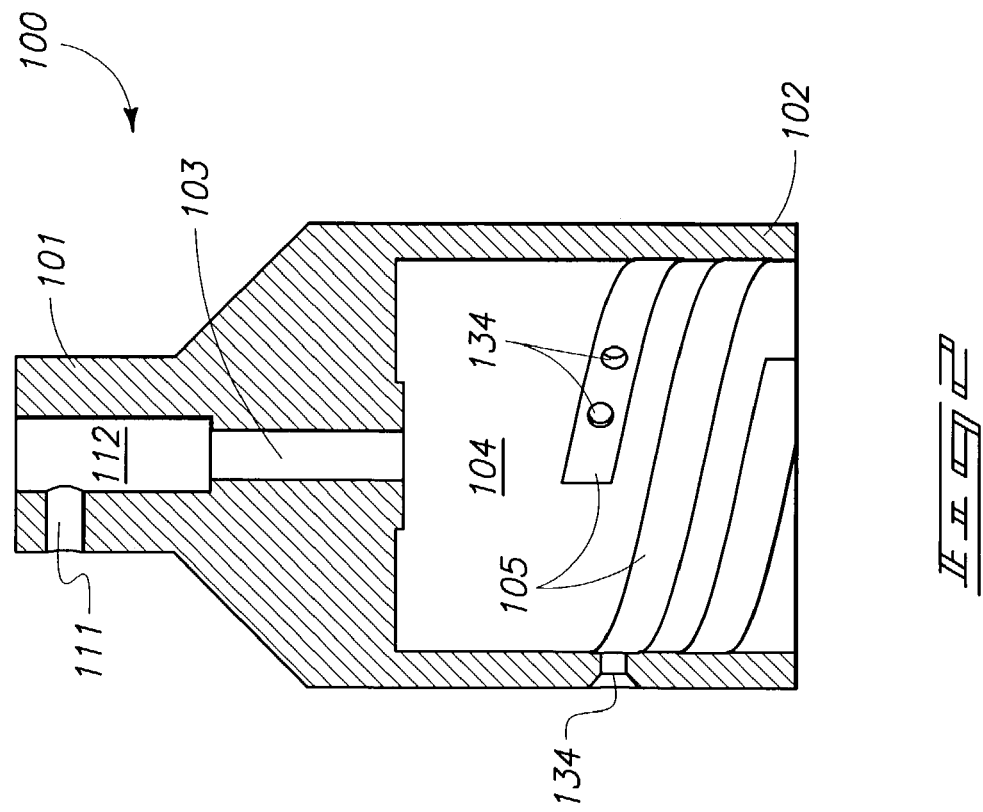
FIG. 2 is section 2—2 from FIG. 1.

FIG. 2 is section 2—2 from FIG. 1, and shows coupling 100, top portion 101, bottom portion 102, inner cavity 104, bolt apertures 134, internal thread pathway 105, internal aperture 112, aperture 103, and transverse aperture 111. Again, the thread passageway 105 shown may be representative only or it may actually be imparted into the inner wall of the inner cavity 104 of the coupling 100, as described above.

FIG. 3 is section 3—3 from FIG. 1, illustrating the coupling 100, bolt apertures 134, with the inner cavity 104 being appropriately sized and configured to receive a corresponding end of the shaft, and inner wall 128 within inner cavity 104.

FIG. 4 is a top view of one embodiment of a discontinuous thread 130 which may be utilized in the embodiment of the invention shown in FIG. 1, illustrating thread body 132 with inner surface 133, bolt apertures 134 and side 131. The bolt apertures 134 may (but need not be) be internally threaded to attach and secure to bolts to secure discontinuous thread 130 within inner cavity 104 in such a way to provide a discontinuous thread to engage external threads on a shaft. Other fastening ways may also be employed, with no one in particular being required to practice the invention. Outer surface 129 of discontinuous thread 130 preferably approximately corresponds to the inner surface or inner wall (shown as item 128 in FIG. 3) of the inner cavity of the coupling, and the inner surface 133 preferably approximately corresponds to the outer surface of the shaft to be rotated therein.

FIG. 5 is a front elevation view of the embodiment of the discontinuous thread 130 shown in FIG. 4, illustrating inner surface 133, and a pitch or angle and bolt apertures 134. The pitch or angle would correspond to the thread passageway. Bolts 106, 107 or 112 (shown in FIG. 7) may be inserted through bolt apertures 134 to connect to discontinuous threads 130. The discontinuous threads 130 form an approximate discontinuous threaded pathway configuration to allow the coupling to rotatably engage an externally threaded shaft.

FIG. 6 is a side elevation view of the embodiment of the discontinuous thread 130 shown in FIGS. 4 and 5 and illustrates inner surface 133, bottom surface 136, outer surface 129 which preferably approximately matches up against the internal surface in the inner cavity of the coupling, and bolt aperture 134.

Figure 7:
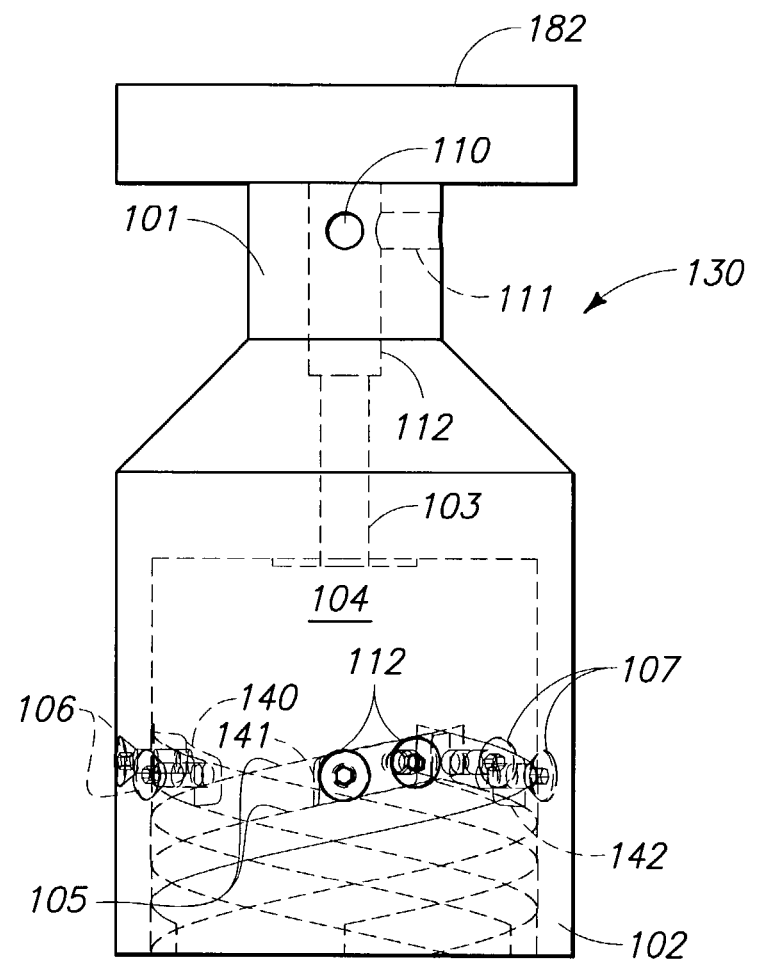
FIG. 7 is an elevation view of an embodiment of a coupling member operationally attached to a drive system, the coupling member including a discontinuous thread configured therein, which may be utilized in this invention.

FIG. 7 is a front elevation view of an embodiment of a coupling 130 contemplated by this invention, wherein the discontinuous threads 140, 141 and 142 are shown bolted into inner cavity 104. Bolts 106, 107 and 112 are inserted through bolt apertures in the coupling wall, and the discontinuous threads 140, 141 and 142 are placed in the thread pattern 105 to form a discontinuous thread pattern to receive an externally threaded shaft therein, effectively coupling the shaft to the device coupled to the top portion 101 of the coupling.

Further illustrated in FIG. 7 are transverse apertures 110 and 111 and top portion 101, vertical apertures 112 and 103 from top portion to inner cavity 104 and bottom portion 102 of coupling 130. FIG.7 also depicts drive system 182, which may be a motor or other drive device with hardware to allow coupling 130 to be operatively attached thereto. No particular type or design of drive system 182 is required to practice this invention as drive systems are well known and any one of a number of drive systems 182 may be utilized in aspects of this invention.

Figure 8:
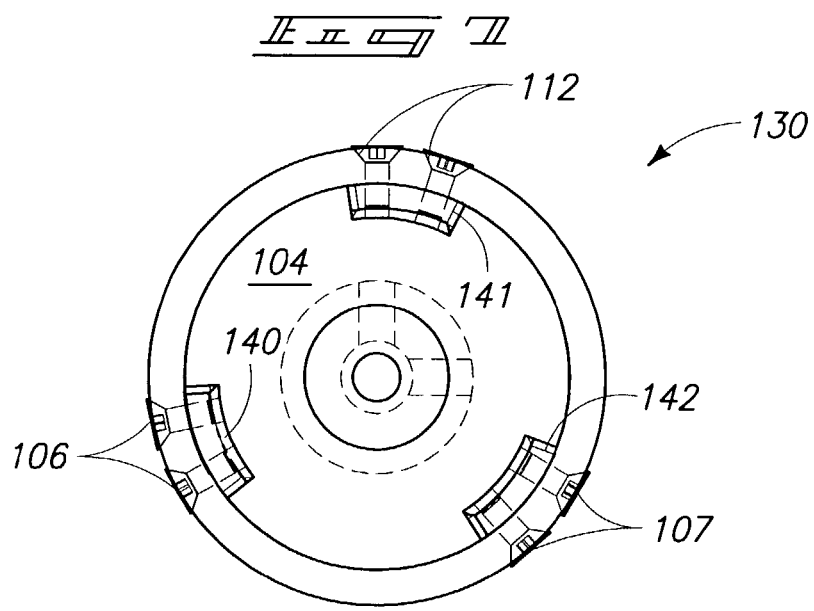
FIG. 8 is a bottom view of the coupling member illustrated in FIG. 7.

FIG. 8 is a bottom view of the embodiment of the coupling illustrated in FIG. 7, showing coupling 130, inner cavity 104, discontinuous threads 140, 141 and 142 with bolt apertures 106, 107 and 112.

FIG. 9 is a front elevation view of an end of an elongated shaft to be coupled with a coupling, such as that shown in prior Figures. FIG. 9 illustrates shaft 170, shaft body 171, shaft threaded portion 172 with threads 174 and grooves 173. The threads 174 are configured to slidingly engage with discontinuous threads within the coupling such as those shown in prior Figures. It will be appreciated by those of ordinary skill in the art that rotating shaft 170 into a coupling such as that shown in prior Figures, will easily and quickly connect the shaft 170 to the coupling.

FIG. 10 is a top view of the shaft 170 illustrated in FIG. 9, showing shaft top surface 177, grooves 173 and threads 174.

FIG. 11 is section 11—11 from FIG. 9 and illustrates shaft 170, shaft body 171, first shaft aperture 180, second shaft aperture 179, threads 174 and grooves 173. A third shaft aperture 164 is provided off center from aperture 180. First shaft aperture 180 may be utilized as a passageway for the introduction of chemicals and the like in degassing units, or for any other desired purpose. FIG. 11 further shows molten metal processing component 181, which those of ordinary skill in the art may be any one of a number of components, such as a rotor, an impeller, or any other, with no one in particular being required to practice aspects of the invention.

FIG. 11 illustrates an additional embodiment of this invention which configures shaft 170 with two internal apertures which may be utilized to more easily remove the shaft end in the event the shaft 170 breaks within the coupling. Shaft removal tool 168 is shown above the shaft end for illustrative purposes to show how peg 166 matches with first shaft aperture 179 and peg 167 corresponds to third shaft aperture 164. If the shaft breaks and the threaded portion is stuck within the coupling, shaft removal tool 168 may be positioned with the first peg 166 and the second peg 167 directed toward into first shaft aperture 179 and third shaft aperture 164, such that the first and second pegs of the shaft removal tool may be inserted into the shaft apertures (and then rotated) to allow the end of the shaft to be more easily rotated out of the coupling. Arrow 164 illustrates that the rotation of shaft removal tool 168 is accomplished to rotate the shaft out of the coupling, and arrows 165 illustrate the potential movement of shaft removal tool 168 toward the corresponding apertures for engagement.

FIG. 12 shows an alternative embodiment of a threaded portion 201 of a shaft 200 which may be used in embodiments of this invention, illustrating shaft 200, threaded portion 201, top 202, threads 204 and grooves 203. The shaft body 205 terminates at a first end in a threaded portion 201 and the threads overlap such that there is only threaded or rotational movement between the coupling and shaft 200. With multiple parallel threads and an appropriate angle, the shaft can be easily and quickly rotated into a coupling in one-half turns or less, or even less than ¼ or ⅓ of a rotation of shaft 200. The discontinuous threads in the coupling may then be provided at an appropriate angle approximately corresponding to the angle of the parallel threads 204 or to the grooves 203. There may be a plurality of threads 204 around the external surface of the shaft, with the particular number being dependant on the application and the design choices made for the application. A top lip may be provided in the grooves 203 to allow better seating or securing of the discontinuous threads in the inner cavity of the coupling, depending on the application.

This embodiment may be preferable for a quick disconnect and reconnect system, while still providing substantial surface area of interaction between threads 203 and discontinuous threads which may be provided in the inner cavity of a coupling corresponding to the shaft 200.

As will be appreciated by those of reasonable skill in the art, there are numerous embodiments to this invention, and variations of elements and components which may be used, all within the scope of this invention.

One embodiment of this invention, for example, is a coupling system for use in molten metal processing in attaching a shaft to a drive system, the coupling system comprising: a coupling with a first end configured for operational attachment to a drive system, and a second end with an open inner cavity configured to receive an elongated shaft, the inner cavity including a plurality of discontinuous threads patterned to rotationally engage external threads on the elongated shaft; a shaft with an elongated body having a first end and a second end, the first end being configured to be coupled to a drive and the second configured for coupling to a molten metal processing component; wherein the first end includes a plurality of parallel threads configured for engagement with a plurality of corresponding discontinuous threads, and further wherein the plurality of parallel threads each extend less than one revolution around the shaft.

Further embodiments of the coupling system described may be: wherein the plurality of parallel threads on the shaft each extend less than one-half of a revolution around the shaft; wherein the plurality of parallel threads each extend less than one-third of a revolution around the shaft; wherein the shaft further includes: a first shaft aperture extending longitudinally through at least a portion of the shaft; a second shaft aperture extending longitudinally through at least a portion of the shaft and offset a transverse distance from the first shaft aperture; and/or wherein the first shaft aperture and the second shaft aperture are each configured to receive part of a shaft removal tool.

In another embodiment, a method may be provided for coupling a shaft utilized in a molten metal processing system to a drive system, comprising the following: machining at least one external thread into a first end of the shaft; providing a coupling with an inner cavity, the inner cavity including a plurality of discontinuous thread sections configured to threadingly engage the at least one external thread in the first end of the shaft; aligning the coupling with an entrance of the at least one external thread; and rotating the at least one external thread into the coupling until securely attached.

Further method embodiments of the foregoing may be: wherein the at least one external thread machined into the first end of the shaft consists of a plurality of parallel threads about the shaft; wherein the shaft is rotated less than one revolution before it effectively attaches the shaft to the coupling; and/or wherein the shaft is rotated less than one-third of a revolution before it effectively attaches the shaft to the coupling.

In another embodiment of the invention, a molten metal processing system may be provided which comprises: a drive system; a coupling extending downward from the drive system; an elongated shaft having a first end and a second end, the coupling operatively attaching the first end of the shaft to the drive system; a first shaft aperture extending longitudinally through at least a portion of the shaft; a second shaft aperture extending longitudinally through at least a portion of the shaft and offset a transverse distance from the first shaft aperture; and wherein the first shaft aperture and the second shaft aperture are each configured to receive part of a shaft removal tool. Further embodiments of this may be wherein the first shaft aperture and the second shaft aperture extend through the same portion of the shaft and/or wherein the molten metal processing system is a degassing device and one of the first shaft aperture and the second shaft aperture provide an injection aperture during operation.

In another embodiment, a coupling may be provided for use in molten metal processing, the coupling comprising: a first end configured for operational attachment to a drive system; a second end with an open inner cavity configured to receive an elongated shaft, the inner cavity including a plurality of discontinuous threads patterned to rotationally engage external threads on the elongated shaft.

In another embodiment of the invention, a shaft may be provided for use in molten metal processing, the shaft comprising: an elongated body having a first end and a second end, the first end being configured to be coupled to a drive and the second configured for coupling to a molten metal processing component; wherein the first end includes a plurality of parallel threads configured for engagement with a plurality of corresponding discontinuous threads, and further wherein the plurality of parallel threads each extend less than one revolution around the shaft. Further embodiments of the shaft may be wherein the plurality of parallel threads each extend less than one-half of a revolution around the shaft; or wherein the plurality of parallel threads each extend less than one-third of a revolution around the shaft.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A coupling system for use in molten metal processing in attaching a shaft to a drive system, the coupling system comprising:
   a coupling with a first end configured for operational attachment to a drive system, and a second end with an open inner cavity configured to receive an elongated shaft, the inner cavity including a plurality of discontinuous threads patterned to rotationally engage external threads on the elongated shaft;
   a shaft with an elongated body having a first end and a second end, the first end being configured to be coupled to a drive and the second configured for coupling to a molten metal processing component;

wherein the first end includes a plurality of parallel threads configured for engagement with a plurality of corresponding discontinuous threads, and further wherein the plurality of parallel threads each extend less than one revolution around the shaft.

2. A coupling system as recited in claim 1, and further wherein the plurality of parallel threads on the shaft each extend less than one-half of a revolution around the shaft.

3. A coupling system as recited in claim 1, and further wherein the plurality of parallel threads each extend less than one-third of a revolution around the shaft.

4. A coupling system as recited in claim 1, and wherein the shaft further includes:
   a first shaft aperture extending longitudinally through at least a portion of the shaft;
   a second shaft aperture extending longitudinally through at least a portion of the shaft and offset a transverse distance from the first shaft aperture; and
   wherein the first shaft aperture and the second shaft aperture are each configured to receive part of a shaft removal tool.

5. A method for coupling a shaft utilized in a molten metal processing system to a drive system, comprising the following:
   machining at least one external thread into a first end of the shaft;
   providing a coupling with an inner cavity, the inner cavity including a plurality of discontinuous thread sections configured to threadingly engage the at least one external thread in the first end of the shaft;
   aligning the coupling with an entrance of the at least one external thread; and
   rotating the at least one external thread into the coupling until securely attached.

6. A method for coupling a shaft utilized in a molten metal processing system to a drive system as recited in claim 5, and further wherein the at least one external thread machined into the first end of the shaft consists of a plurality of parallel threads about the shaft.

7. A method for coupling a shaft utilized in a molten metal processing system to a drive system as recited in claim 5, and further wherein the shaft is rotated less than one revolution before it effectively attaches the shaft to the coupling.

8. A method for coupling a shaft utilized in a molten metal processing system to a drive system as recited in claim 5, and further wherein the shaft is rotated less than one-third of a revolution before it effectively attaches the shaft to the coupling.

9. A coupling for use in molten metal processing, comprising:
   a first end configured for operational attachment to a drive system;
   a second end with an open inner cavity configured to receive an elongated shaft, the inner cavity including a plurality of discontinuous threads patterned to rotationally engage external threads on the elongated shaft.

* * * * *